Aug. 19, 1952  E. HUSEBY  2,607,181
DUMP RAKE LOCKING DEVICE
Filed Dec. 1, 1950  2 SHEETS—SHEET 1
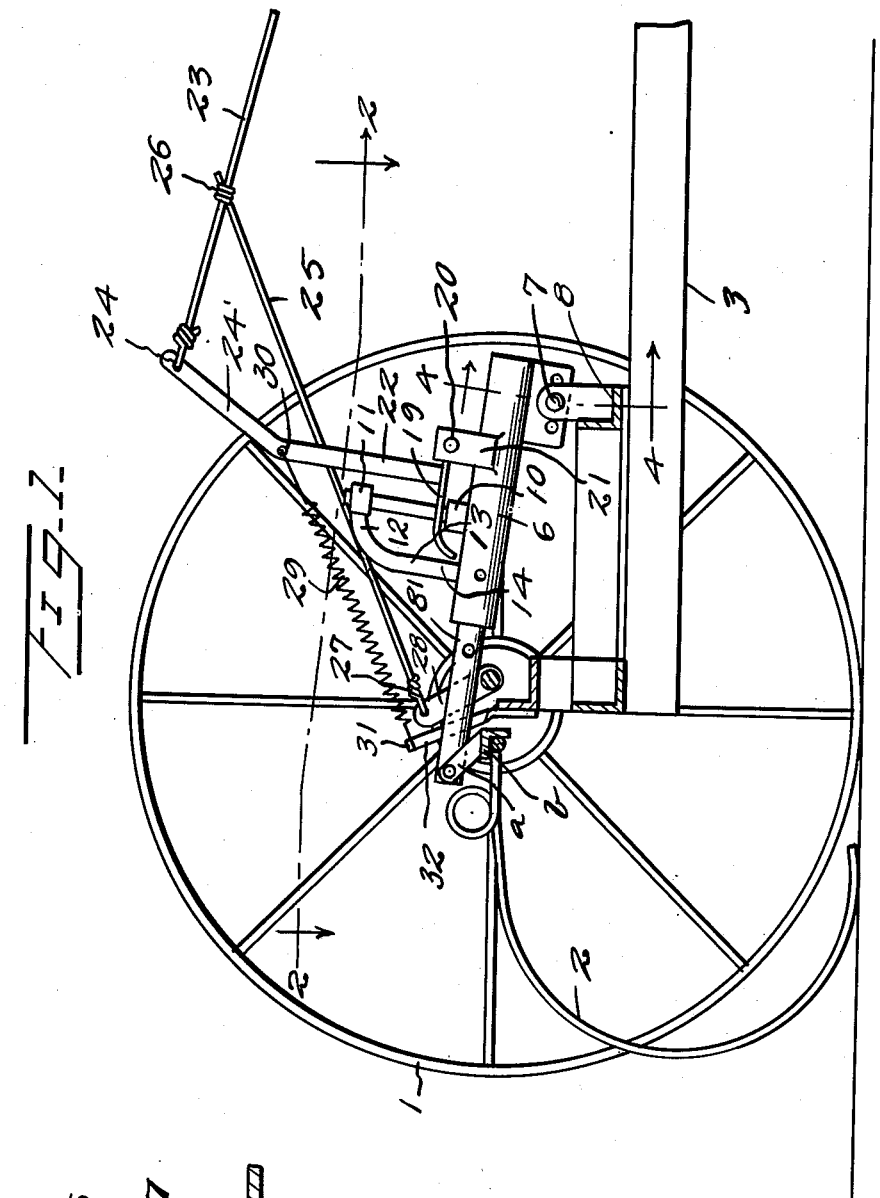
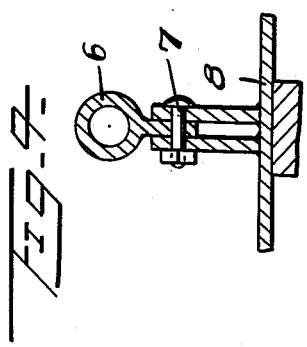
INVENTOR
*Ervin Huseby*
BY
ATTORNEY

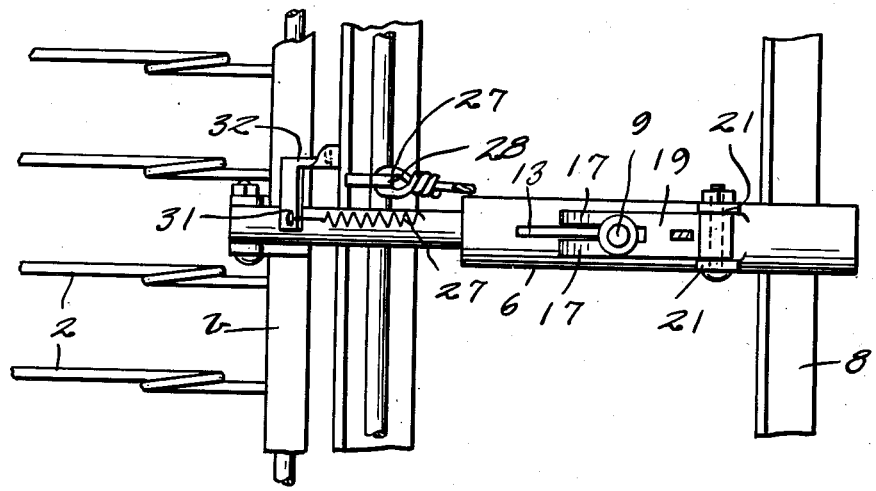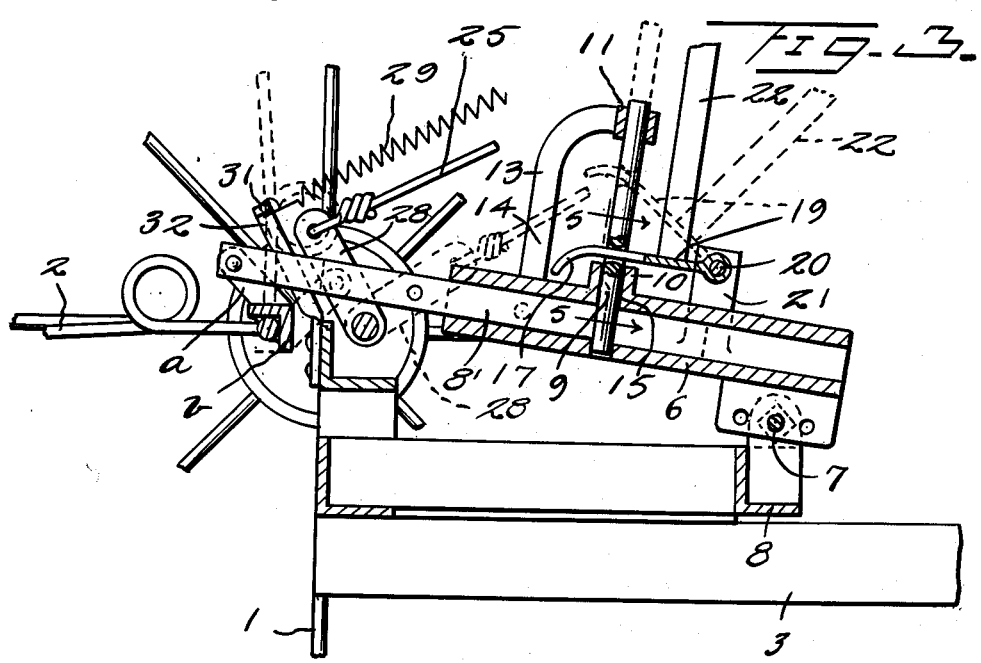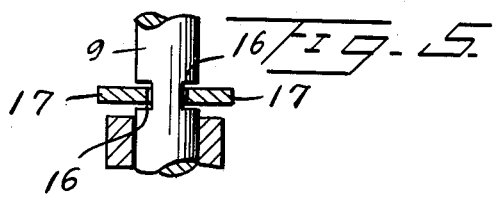

Patented Aug. 19, 1952

2,607,181

UNITED STATES PATENT OFFICE 2,607,181

DUMP RAKE LOCKING DEVICE

Ervin Huseby, Belview, Minn.

Application December 1, 1950, Serial No. 198,662

1 Claim. (Cl. 56—386)

This invention relates to new and useful improvements in dump rake locking devices.

The primary object of my invention is to provide a locking device for the ordinary horse drawn or tractor drawn hay dumping rake, whereby the operator can operate the machine from a tractor and eliminate the need of an additional man on the frame of the dump rake.

A further object of my invention is to provide a novel locking mechanism whereby the hay rake is automatically locked in hay raking position, but may be dumped from time to time, as occasion may require, by the operator of the tractor, simply by exerting a pull on a rope or cable connected to a control lever of the locking device.

A still further object of my invention is to provide a dump rake locking device of the character specified, that is relatively simple and economical in construction, may be easily and readily installed, and is highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation, illustrating the application of my invention.

Figure 2 is a horizontal section, taken on line 2—2 of Figure 1.

Figure 3 is an enlarged fragmentary sectional view of the locking device, with the parts shown in rake locking position in full lines and in rake releasing position in dotted lines.

Figure 4 is a detail vertical transverse section, taken on line 4—4 of Figure 1, and Figure 5 is a similar view, taken on line 5—5 of Figure 3.

Referring to the drawings for a more particular description of my invention, and in which drawings like parts are designated by like reference characters throughout the several views, A designates the hay dump rake, as a whole, which may be of any well known make, and comprises the supporting wheels 1, rake 2, and frame 3.

In carrying out my invention, the dump rake may be controlled and operated by the operator of the tractor (not shown), thus dispensing with the services of a second man or operator at the rear on the dump rake frame. This is accomplished by providing a novel locking device or mechanism, consisting of the following means: A cylindrical sleeve 6 is mounted on and bolted or otherwise attached at its front end, as at 7, to the cross bar 8 of the dump rake frame 3 and a shaft 8' is mounted for limited reciprocating movement in said sleeve. The rear end of the shaft 8' is connected by means of the rearwardly inclined arm $a$ to the horizontal transverse frame bar $b$ carrying the tines of the hay rake. A perpendicular locking pin 9 is arranged with its lower end working in a cylindrical nipple 10 formed on the top and at or near the center of the aforesaid sleeve, and with its upper end working in a collar 11, formed at the outer end of the horizontal arm 12 of the right-angle bracket or support 13, in vertical alignment with the nipple 10. The lower end of the vertical arm 14 of the bracket 13 is cast integral with the rear end of the sleeve 6. The top of the sleeve 6 is further provided with a vertical opening 15 disposed in registration with the lower end of the locking pin 9 to permit the latter to work back and forth in the sleeve, the purpose of which will presently appear. The upper end of the locking pin 9 is formed with the diametrically opposed notches or recesses 16 to receive the tines 17 of the fork 18 of the horizontally disposed actuating bar 19, positioned on the cylindrical sleeve 6, with its front end pivoted, as at 20, to the bearing brackets 21.

An upright control lever 22 is arranged with its lower end connected to the actuating bar 19 and a rope or cable 23 is connected at one end, as at 24, to the forwardly inclined upper end 24' of the control lever 22 and extends forwardly within convenient reach of the operator of the tractor. A second rope or cable 25 is connected at its upper end, as at 26, to the rear end of the cable 23, and is connected at its lower end, as at 27, to the arm 28 of the usual dumping device of the hay rake. A coil spring 29 is attached at one end, as at 30, to the upper end of the perpendicular portion of the control lever 22 and at its opposite end, as at 31, to the upper end of the bracket 32, attached to the frame of the dump rake, the purpose of which will presently appear.

In practice, the dump rake is automatically locked in lowered or hay raking position by means of the locking pin 9, whose lower end engaged the front end of the reciprocating shaft 8', working in the cylindrical sleeve 6.

To dump the hay rake from time to time, as occasion may require, the operator riding on the tractor merely exerts a pull on the rope or cable 23, which in turn swings the control lever 22 forwardly against the tension of the coil spring 29 and raises the lower end of the locking pin 9 out of the cylindrical sleeve 6 in disengaged relation with the front end of the reciprocating shaft 8'. At the same time, the arm 28 of the dumping device is actuated through the medium of the cables 23 and 25, respectively, and causes the dogs in the wheels 1 of the hay rake to engage and dump the rake in the usual manner. The latter is the usual equipment on all hay rakes of this type and constitutes no part of my invention. After the rake has been dumped, it automatically drops back into raking position and the control lever 22 is automatically returned into normal upright position by the action of the coil spring 29. This causes the locking pin 9 to drop back or return into locking position, through the movement of the actuating bar 19 and locks the hay rake into locking position until such time as the next dumping operation is indicated.

From the foregoing description taken in connection with the drawings, it is thought that the construction, operation and advantages of my invention will be readily understood without requiring a more extended explanation.

Having described my invention, what I claim as new and desire to secure by Letters Patent, is:

In combination with a dump rake, a dump rake locking device of the character specified, comprising a cylindrical sleeve mounted on the dump rake frame, a rearwardly inclined arm rigidly secured to the frame bar carrying the tines of the hay rake, a reciprocating shaft mounted in said sleeve and connected at its rear end to the free end of said arm, a vertical locking pin working up and down in said sleeve and co-acting with said shaft in locking the dump rake in hay raking position, means under the control of the operator for releasing said locking pin, said means comprising a forked actuating bar arranged with one end pivoted to said sleeve and its opposite end engaging said locking pin, an upright control lever connected at its lower end to said actuating bar, a flexible element connected at one end to said control lever and extending forwardly within convenient reach of the operator, a second flexible element connected at its rear end to the dump device of the hay rake and at its opposite end to the rear end of said first mentioned flexible element, and a coil spring for returning the control lever, actuating bar and locking pin into normal position when the hay rake returns into hay raking position.

ERVIN HUSEBY.

REFERENCES CITED

The following references are of record in the file of this patent:

UNITED STATES PATENTS

| Number  | Name   | Date          |
|---------|--------|---------------|
| 618,117 | Miller | Jan. 24, 1899 |